United States Patent [19]

Chiba et al.

[11] Patent Number: 5,435,435
[45] Date of Patent: Jul. 25, 1995

[54] ADJUSTABLE CONVEYOR BELT

[75] Inventors: Hitoshi Chiba, Takatsuki; Tomofumi Ohtani, Suita; Toshio Takahashi, Toyonaka; Kenji Kose; Katsutoshi Shibayama, both of Higashiosaka; Masaaki Ikeda, Daito, all of Japan

[73] Assignee: Tsubakimoto Chain Co., Osaka, Japan

[21] Appl. No.: 271,790

[22] Filed: Jul. 7, 1994

[30] Foreign Application Priority Data

Jul. 13, 1993 [JP] Japan ............... 5-043184 U

[51] Int. Cl.6 ............................. B65G 17/06
[52] U.S. Cl. ............................. 198/853
[58] Field of Search ...................... 198/851-853

[56] References Cited

U.S. PATENT DOCUMENTS

| 4,858,753 | 8/1989 | Hodlewsky . | |
|---|---|---|---|
| 4,886,158 | 12/1989 | Lapeyre | 198/853 |
| 4,993,544 | 2/1991 | Bailey et al. | 198/853 |
| 5,000,312 | 3/1991 | Damkjaer | 198/853 |
| 5,020,659 | 6/1991 | Hodlewsky . | |
| 5,096,053 | 5/1992 | Hodlewsky . | |
| 5,217,110 | 6/1993 | Spangler et al. | 198/853 |
| 5,293,989 | 3/1994 | Garbagnati | 198/853 |
| 5,303,818 | 4/1994 | Gruettner et al. | 198/853 |
| 5,335,768 | 8/1994 | Schladweiler | 198/853 |

Primary Examiner—Joseph E. Valenza
Attorney, Agent, or Firm—Howson & Howson

[57] ABSTRACT

An improved adjustable conveyor belt has a plurality of modules having intermeshing link ends extending lengthwise. The modules are connected together by connecting pins extending widthwise through holes formed in the link ends. Each of the modules also has side edges and a slot adjacent to each of its side edges. Thus, slots are provided along the side edges of the belt regardless of the arrangement of the modules. A stop, removably fitted into slots located along the side edges of the belt, prevents widthwise movement of the connecting pins. The stop has a guide mechanism for guiding the stop into the slot, an end portion which extends into the pin insertion hole, an engaging portion which engages a tongue formed in the slot, and a protrusion which snaps into the pin insertion hole. This configuration makes it easy to assemble, add to, and dismantle the conveyor belt, without substantially increasing the size or weight of the assembly.

3 Claims, 3 Drawing Sheets

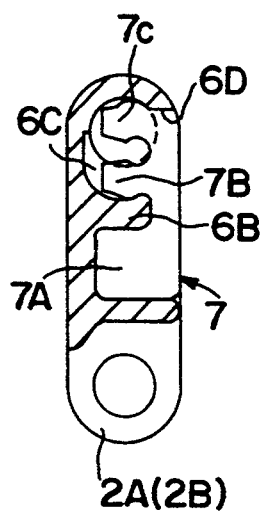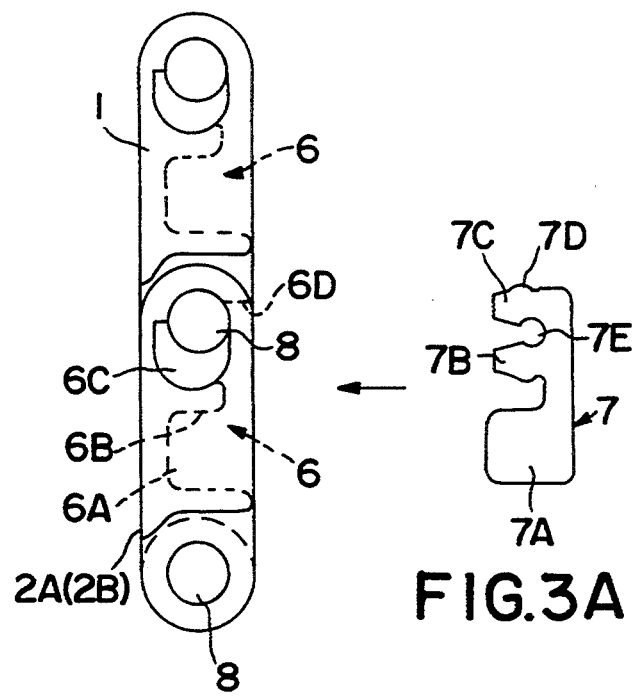
FIG.3C FIG.3B FIG.3A

ADJUSTABLE CONVEYOR BELT

BRIEF SUMMARY OF THE INVENTION

This invention relates to conveyor belts which are used to transport articles along a longitudinal path. It is specifically concerned with an improvement in conveyor belts of the type capable of adjustments in length and width.

U.S. Pat. Nos. 5,096,053, 5,020,659, and 4,858,753, to Hodlewsky, describe conveyor belts which are capable of adjustments in length and width. Conveyor belt modules having different widths are connected by pins. The pins are inserted through pin holes which are formed in intermeshing link ends in each module. Plates, along one edge of the conveyor belt, formed as part of the modules at that edge, prevent the pins from moving laterally in one direction. Spring plugs are inserted into pin insertion holes at the opposite edge of the conveyor belt. The spring plugs snap into the pin insertion holes and prevent the pins from moving laterally in the opposite direction. The length and width of the belt can be adjusted by the addition or removal of modules.

As will be explained more fully in the following detailed description, the prior art conveyor belts give rise to numerous problems and disadvantages. Modules configured for placement on the left side of the belt cannot be used on the right side, or anywhere in between, and vise versa. The conventional modules are thus not interchangeable, and this complicates the assembly of the conveyor belt. The fact that the pins may only be inserted in a single direction further impedes assembly. Disengaging the pins is further complicated by fact that the spring plugs snap into the pin insertion holes and are somewhat difficult to remove.

The principal object of this invention is to provide an adjustable conveyor belt having versatile modules which are capable of being used interchangeably. Another object of the invention is to provide an adjustable conveyor belt in which the pins may be inserted into the insertion holes from either side of the belt. Yet another object of the invention is to provide an adjustable conveyor belt in which the pins may be easily disengaged from the assembly. A further object of the invention is to promote ease of assembly and adjustment of the adjustable conveyor belt.

In the adjustable conveyor belt in accordance with the invention modules having intermeshing link ends extending lengthwise of the belt, are connected together by connecting pins extending widthwise through holes formed in the link ends. Each of the modules also has side edges and a slot adjacent to each of its side edges. Corresponding slots are provided along the side edges of the belt. A stop, removably fitted into slots located along the side edges of the belt, prevents widthwise movement of the connecting pins. The stop has a guide mechanism for guiding the stop into the slot, an end portion which extends into the pin insertion hole, an engaging portion which communicates with a tongue formed in the slot, and a protrusion which snaps into the pin insertion hole. This configuration makes it easy to assemble, add to, and dismantle the conveyor belt, without substantially increasing the size or weight of the assembly.

BRIEF DESCRIPTION OF THE DRAWINGS

FIG. 3A is an elevational view of a stop in accordance with the invention;

FIG. 3B is a side elevational view of the adjustable conveyor belt in accordance with the invention;

FIG. 3C is a side elevational view, partly in section, of the adjustable conveyor belt in accordance with the invention;

DETAILED DESCRIPTION

Figure 5:
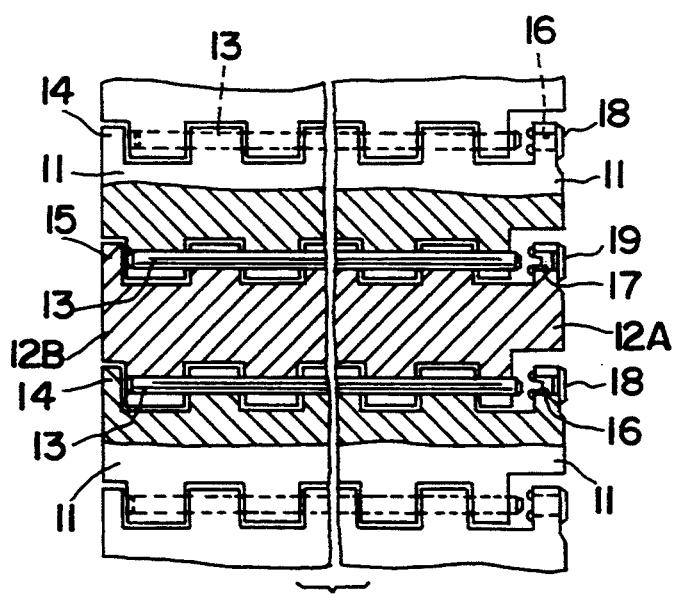
FIG. 5 is a partially broken away bottom plan view, partly in section, of an adjustable conveyor belt of the prior art.

The adjustable conveyor belt of the prior art, as depicted in FIG. 5, comprises modules 11, 12A, and 12B of disparate widths which are hinged by pins 13. The pins 13 are inserted into pin insertion holes 16 and 17 formed at an edge of each module 11, 12A, and 12B. Plates 14 and 15, located at the opposite edges of modules 11 and 12B, prevent the pins from moving laterally in one direction. Spring plugs 18 and 19 are inserted into the pin insertion holes 16 and 17 on modules 11 and 12A at the edges of the conveyor belt. The spring plugs 18 and 19 snap into the pin insertion holes 16 and 17 and prevent the pins 13 from moving laterally in the opposite direction.

Figure 1:
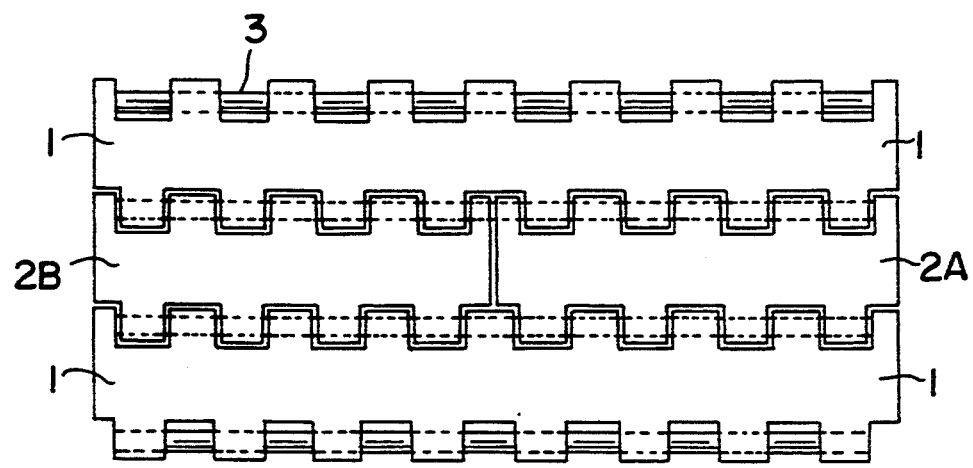
FIG. 1 is a fragmentary top plan view of the adjustable conveyor belt in accordance with the invention.
Figure 2:
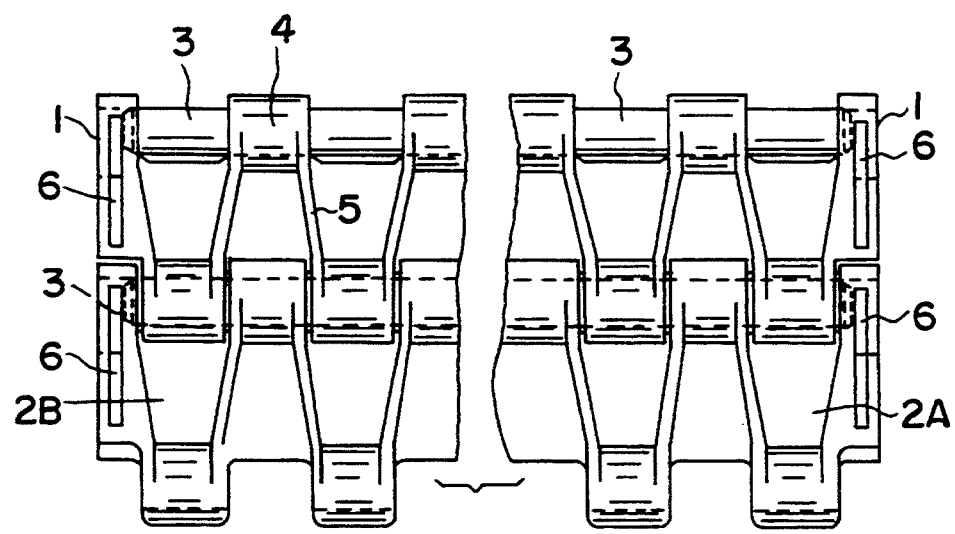
FIG. 2 is a partially broken away bottom plan view of a part of the adjustable conveyor belt in accordance with the invention.

The adjustable conveyor belt, in accordance with the invention, as shown in FIGS. 1 and 2, comprises modules 1, 2A, and 2B. Module 1 is wider than either of modules 2A and 2B. The modules 1, 2A, and 2B are provided with boss portions 4 which may be driven by a sprocket wheel (not shown). Pins 3 extend through bores formed in the boss portions 4 thereby connecting the modules 1, 2A, and 2B. Ribs 5 are formed in the modules 1, 2A, and 2B which bridge adjacent boss portions 4. Longitudinally extending slots 6 are formed in the underside of modules 1 and 2B along the left edges, and in the underside of modules 1 and 2A along the right edges.

Stops 7 snap into the slots 6 as shown in FIGS. 3A, 3B, and 3C. Each stop 7 is fashioned from a thin plate and comprises a guide portion 7A, an engagement portion 7B, and an end portion 7C having a protrusion 7D. The guide portion is received in a corresponding recess 6A formed in the slot 6. The engagement portion 7B snaps into engagement with a tongue 6B formed in the slot 6 and extends into a recess 6C formed within the slot 6. The end portion 7C extends into the pin insertion hole 8, with its protrusion 7D snapping into the hole 8 after passing through the entrance 6D of the slot 6. FIG. 5 illustrates the manner in which the stop 7 is received in the slot 6.

A notch 7E, formed at the proximal end of the engagement portion 7B and the end portion 7C, facilitates the disengagement of the stop 7 from the slot 6 by allowing portions 7B and 7C to flex resiliently relative to each other.

The modules of the improved adjustable conveyor belt may be used interchangeably at any location along the assembly. The pins may be inserted into the pin insertion holes from either side of the assembly, and are configured to snap easily into and out of engagement with the modules. These features make it easier to assemble, add to, and dismantle the conveyor belt assembly. Also, inserting and removing the stop in a direction which is perpendicular relative to the conveyor belt allows the conveyor belt to be assembled and dismantled when obstructions are present alongside it. Additionally, the stops are fashioned from a thin plate and thus do not substantially increase the size or weight of the assembly.

Figure 4:
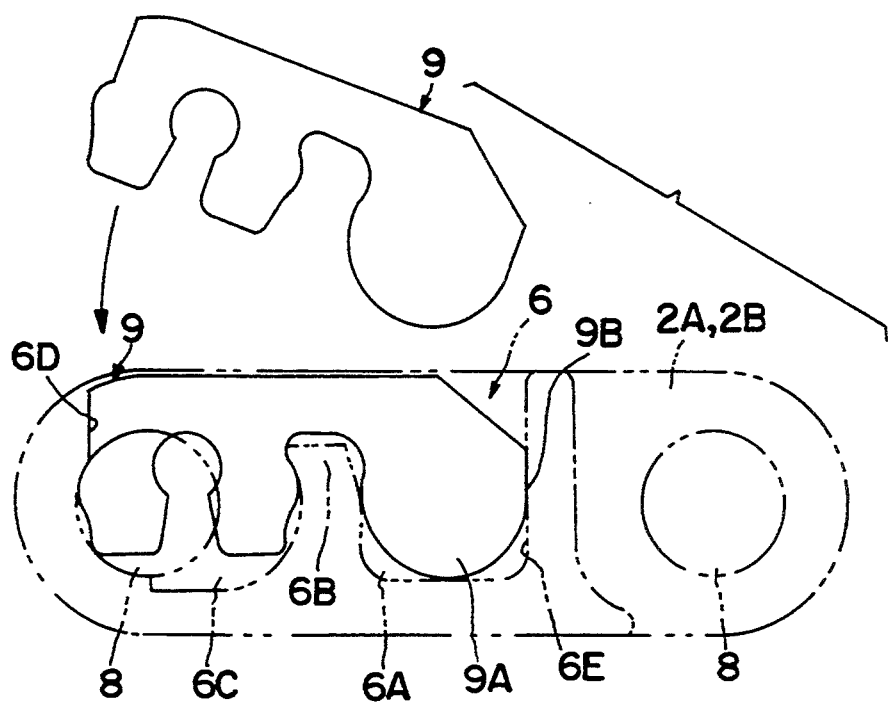
FIG. 4 is a side elevational view of another embodiment of the adjustable conveyor belt in accordance with the invention.

Various modifications can be made to the apparatus described. For example, in stop 9 shown in FIG. 4, the profile of the guide portion 9A can be curved. A flat surface 9B may be formed at one end of the curved guide portion 9A. The stop 9 thus configured is inserted into the slot 6 by rotating it counterclockwise and using the guide portion 9A as a fulcrum. Following insertion, the flat surface 9B abuts the upright wall 6E of the slot 6 to resist disengagement by clockwise rotation of the stop. Still other modifications can be made to the invention described herein without departing from its scope as defined in the following claims.

We claim:

1. An adjustable conveyor belt having a length extending in the direction of belt movement, side edges, and a width extending transverse to the direction of belt movement from one of said side edges to the other, the belt comprising a plurality of modules having intermeshing link ends extending lengthwise, the modules being connected together by connecting pins extending widthwise through holes formed in said link ends, and each of the modules also having side edges, wherein each module has a slot adjacent to each of its side edges whereby slots are provided along the side edges of the belt, and having pin stop means, removably fitted into slots located along the side edges of the belt, for preventing widthwise movement of said connecting pins, and wherein a tongue is formed in each slot and the pin stop means further comprises means for snap-fit engagement with said tongue.

2. An adjustable conveyor belt according to claim 1 wherein the pin stop means comprises guide means for guiding said stop means into a slot and end means for advancing into register with a connecting pin.

3. An adjustable conveyor belt according to claim 1 wherein the belt has a pin insertion hole having a wall, and wherein the pin stop means comprises end means for advancing into register with said pin insertion hole, and wherein said end means comprises a protrusion which snaps into engagement with the wall of said pin insertion hole.

* * * * *